(12) United States Patent
Ji

(10) Patent No.: US 12,501,363 B2
(45) Date of Patent: Dec. 16, 2025

(54) SIDELINK INFORMATION TRANSMISSION METHOD AND TERMINAL

(71) Applicant: VIVO MOBILE COMMUNICATION CO., LTD., Guangdong (CN)

(72) Inventor: Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 703 days.

(21) Appl. No.: 17/165,865

(22) Filed: Feb. 2, 2021

(65) Prior Publication Data

US 2021/0160778 A1 May 27, 2021

Related U.S. Application Data

(63) Continuation of application No. PCT/CN2019/097697, filed on Jul. 25, 2019.

(30) Foreign Application Priority Data

Aug. 3, 2018 (CN) .......................... 201810879398.9

(51) Int. Cl.
*H04W 52/02* (2009.01)
*H04W 72/23* (2023.01)

(52) U.S. Cl.
CPC ....... *H04W 52/0229* (2013.01); *H04W 72/23* (2023.01)

(58) Field of Classification Search
CPC ... H04L 5/0023; H04L 5/0044; H04L 5/0051; H04L 5/0053; H04L 5/0091; H04W 4/46; H04W 52/0212; H04W 52/0229; H04W 52/0241; H04W 72/23; H04W 76/11; H04W 76/14; H04W 76/40; H04W 8/005; H04W 92/18; Y02D 30/70
See application file for complete search history.

(56) References Cited

U.S. PATENT DOCUMENTS

| | | | |
|---|---|---|---|
| 2013/0029675 A1 | 1/2013 | Kwon et al. | |
| 2014/0307670 A1 | 10/2014 | Kim et al. | |
| 2016/0044666 A1 | 2/2016 | Shin et al. | |
| 2017/0041972 A1 | 2/2017 | Yi et al. | |
| 2017/0048905 A1* | 2/2017 | Yun ...................... | H04W 76/14 |

(Continued)

FOREIGN PATENT DOCUMENTS

| | | |
|---|---|---|
| CN | 106793092 A | 5/2017 |
| CN | 107852717 A | 3/2018 |

(Continued)

OTHER PUBLICATIONS

Yasukawa et al., "D2D Communications in LTE-Advanced Release 12" Technology Reports, Further Development of LTE-Advanced—Release12 Standardization Trends—, vol. 17, No. 2, Oct. 2, 2015.

(Continued)

*Primary Examiner* — Quoc Thai N Vu
(74) *Attorney, Agent, or Firm* — Price Heneveld LLP

(57) ABSTRACT

This disclosure discloses a sidelink information transmission method and a terminal. The method includes: receiving sidelink control information SCI; and determining, based on a sidelink transmission identifier indicated by the SCI, whether to receive or demodulate a physical sidelink shared channel PSSCH or not.

11 Claims, 2 Drawing Sheets

---

Receive sidelink control information SCI — 11

↓

Determine, based on a sidelink transmission identifier indicated by the SCI, whether to receive or demodulate a physical sidelink shared channel PSSCH or not — 12

(56) References Cited

U.S. PATENT DOCUMENTS

| | | | |
|---|---|---|---|
| 2017/0054540 A1 | 2/2017 | Kim | |
| 2018/0116007 A1 | 4/2018 | Yasukawa et al. | |
| 2018/0124682 A1* | 5/2018 | Chae | H04L 5/0091 |
| 2018/0212734 A1* | 7/2018 | Zhang | H04L 69/22 |
| 2018/0213438 A1 | 7/2018 | Muraoka et al. | |
| 2019/0053204 A1* | 2/2019 | Lien | H04W 4/40 |
| 2019/0053251 A1* | 2/2019 | Loehr | H04W 72/1263 |
| 2020/0076535 A1* | 3/2020 | Xu | H04L 43/0847 |
| 2020/0412485 A1* | 12/2020 | Wang | H04L 1/0081 |
| 2021/0219320 A1* | 7/2021 | Belleschi | H04W 72/20 |

FOREIGN PATENT DOCUMENTS

| | | |
|---|---|---|
| CN | 107995605 A | 5/2018 |
| JP | 2017163173 A | 9/2017 |
| JP | 2018534882 A | 11/2018 |
| KR | 20180054785 A | 5/2018 |
| WO | 2011133004 A2 | 10/2011 |
| WO | 2016136492 A1 | 9/2016 |
| WO | 2017049490 A1 | 3/2017 |
| WO | 2017078296 A1 | 5/2017 |
| WO | 2018012614 A1 | 1/2018 |
| WO | 2018135905 A1 | 7/2018 |

OTHER PUBLICATIONS

JP Office Action in Application No. 2021-505899 dated Mar. 22, 2022.

Written Opinion and International Search Report dated Feb. 18, 2021 as received in application No. PCT/CN2019/097697.

Chinese Office Action dated Sep. 23, 2020 as received in application No. 201810879398.9.

Japanese Office Action dated Aug. 1, 2022 as received in application No. 2021-505899.

Singapore Written Opinion dated Oct. 6, 2022 as received in application No. 11202100841V.

"SA content for V2V" 3GPP TSG RAN WG1 Meeting #85 R1-164636, May 23, 2016. Lenovo.

"Discussion on SCI contents for V2V" 3GPP TSG RAN WGI Meeting #85, R1-164103. Nanjing, China. May 23, 2016. Huawei.

European Search Report dated Sep. 9, 2021 as received in application No. 19843763.4.

NTT Docomo, Remaining Issues on Resource Allocation for UE-to-Network Relay, 3GPP TSG RAN WG1 Meeting #82 R1-154646, Beijing, China, Aug. 24-28, 2015.

Ericsson, Contents of PSCCH for V2V over PC5, 3GPP TSG RAN WG1 Meeting #86 R1-167011, Gothenburg, Sweden, Aug. 22-26, 2016.

\* cited by examiner

SIDELINK INFORMATION TRANSMISSION METHOD AND TERMINAL

CROSS-REFERENCE TO RELATED APPLICATIONS

This application is a continuation of PCT Application No. PCT/CN2019/097697 filed on Jul. 25, 2019, which claims priority to Chinese Patent Application No. 201810879398.9 filed in China on Aug. 3, 2018, which is incorporated herein by reference in its entirety.

TECHNICAL FIELD

This disclosure relates to the field of communications technologies, and in particular, to a sidelink information transmission method and a terminal.

BACKGROUND

In a long term evolution (Long Term Evolution, LTE) mobile communication system, a sidelink (sidelink) is used for direct transmission between terminals without using a network device. A terminal sends sidelink control information (Sidelink Control Information, SCI) over a physical sidelink control channel (Physical Sidelink Control Channel, PSCCH), to schedule transmission of a physical sidelink shared channel (Physical Sidelink Shared Channel, PSSCH) for data transmission. Sidelink transmission is based on broadcast, and the terminal does not establish a point-to-point connection at a physical layer. For a receiver, the SCI transmitted from the physical layer neither includes any sender or receiver indication nor distinguishes between unicast, multicast, and broadcast PSSCHs, the terminal can only demodulate all received data, and then distinguishing and response processing are performed at a higher layer. For example, the terminal determines and discards, by using a layer 2 identity (L2 ID) of a medium access control (Medium Access Control, MAC) layer, unicast data that is not sent to the terminal. The terminal demodulates all the received data and then discards the data that is not intended for the terminal. This increases processing energy consumption of the terminal and wastes a processing capacity of the terminal.

SUMMARY

Embodiments of this disclosure provide a sidelink information transmission method and a terminal to resolve the problem of high processing energy consumption of a terminal during sidelink transmission.

According to a first aspect, an embodiment of this disclosure provides a sidelink information transmission method applied to a first terminal side, including:
  receiving sidelink control information SCI; and
  determining, based on a sidelink transmission identifier indicated by the SCI, whether to receive or demodulate a physical sidelink shared channel PSSCH or not.

According to a second aspect, an embodiment of this disclosure further provides a terminal, where the terminal is a first terminal and includes:
  a receiving module, configured to receive sidelink control information SCI; and
  a first processing module, configured to determine, based on a sidelink transmission identifier indicated by the SCI, whether to receive or demodulate a physical sidelink shared channel PSSCH or not.

According to a third aspect, an embodiment of this disclosure provides a sidelink information transmission method applied to a second terminal side, including:
  sending sidelink control information SCI, where the SCI is used to indicate a sidelink transmission identifier.

According to a fourth aspect, an embodiment of this disclosure provides a terminal, where the terminal is a second terminal and includes:
  a sending module, configured to send sidelink control information SCI, where the SCI is used to indicate a sidelink transmission identifier.

According to a fifth aspect, an embodiment of this disclosure provides a terminal, where the terminal includes a processor, a memory, and a computer program stored in the memory and running on the processor, and when the computer program is executed by the processor, the steps of the foregoing sidelink information transmission method performed on the first terminal side or the second terminal side are implemented.

According to a sixth aspect, an embodiment of this disclosure further provides a computer-readable storage medium, where the computer-readable storage medium stores a computer program, and when the computer program is executed by a processor, the steps of the foregoing sidelink information transmission method performed on the first terminal side or the second terminal side are implemented.

In this way, when the foregoing technical solutions in the embodiments of this disclosure are used, the receiving-side terminal may determine, based on the sidelink transmission identifier, whether to receive or demodulate a PSSCH corresponding to the SCI or not, so that there is no need to receive or demodulate the PSSCH each time, thereby reducing processing energy consumption of the terminal and saving a processing capacity.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the number used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. "And/or" in the specification and claims represents at least one of connected objects.

Figure 1:
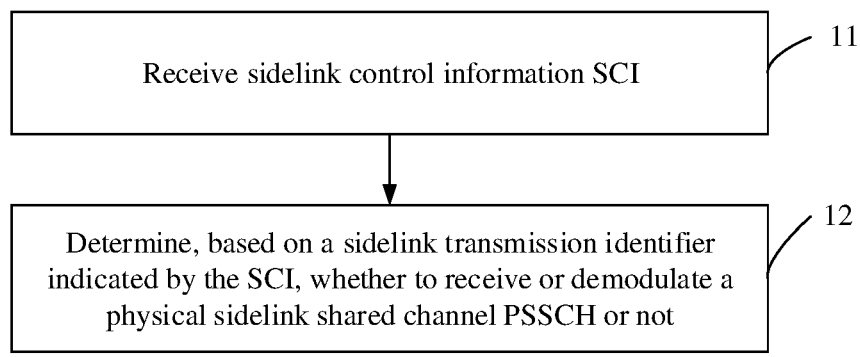
FIG. 1 is a schematic flowchart of a sidelink information transmission method for a first terminal according to an embodiment of this disclosure.

An embodiment of this disclosure provides a sidelink information transmission method, applied to a first terminal side. As shown in FIG. 1, the method includes the following steps.

Step 11: Receive sidelink control information SCI.

The SCI is sent by a second terminal. In this case, the first terminal serves as a receiving-side terminal, and the second terminal serves as a sending-side terminal. Those skilled in the art can understand that when having data to send, the first terminal may also serve as a sending-side terminal, and the second terminal may also serve as a receiving-side terminal. The SCI in this embodiment of this disclosure is used to indicate a sidelink transmission identifier, or referred to as a transmission identifier ID.

Step 12: Determine, based on a sidelink transmission identifier indicated by the SCI, whether to receive or demodulate a physical sidelink shared channel PSSCH or not.

The sidelink transmission identifier is configured by a higher layer or a network device, or predefined (for example, agreed upon or pre-configured by a protocol). The sidelink transmission identifier may be used to indicate identity information of a sending terminal or a receiving terminal. When identity information of the first terminal matches the identity information of the sending terminal, the first terminal determines that a PSSCH corresponding to the SCI carries information sent to the first terminal. In this case, the PSSCH corresponding to the SCI needs to be received or demodulated. If the identity information of the first terminal does not match the identity information of the sending terminal, the PSSCH is ignored to reduce energy consumption. When identity information of a sending terminal of the SCI belongs to a terminal of interest to the first terminal, the first terminal determines that the PSSCH corresponding to the SCI needs to be received or demodulated. If the identity information of the sending terminal of the SCI does not belong to a terminal of interest to the first terminal, the PSSCH is ignored. In addition, the sidelink transmission identifier may also be used to indicate a type, for example, broadcast, unicast, or multicast, of data transmitted over the PSSCH corresponding to the SCI. If the data is broadcast data, the first terminal determines that the PSSCH corresponding to the SCI needs to be received or demodulated. If the data is unicast or multicast data, and if the first terminal is a unicast or multicast object, the first terminal determines that the PSSCH corresponding to the SCI needs to be received or demodulated; otherwise, the first terminal does not receive or demodulate the PSSCH any longer to save processing energy consumption.

Further, the sidelink transmission identifier includes at least one of a sender identifier, a receiver identifier, a broadcast identifier, a multicast identifier, and a unicast identifier. The sender identifier may be a sending-side terminal identifier, and the receiver identifier may be a receiving-side terminal identifier. The broadcast identifier is used to indicate that the data carried in the PSSCH is broadcast data. The multicast identifier is used to indicate that the data carried in the PSSCH is multicast data and/or a terminal identifier of a receiving group of the data carried in the PSSCH. The unicast identifier is used to indicate that the data carried in the PSSCH is unicast data and/or a receiving-side terminal identifier of the data carried in the PSSCH. The sidelink transmission identifier in this embodiment of this disclosure is determined based on at least some bits of at least one of a layer 2 identity (L2 ID), an application layer identifier, a higher layer identifier (or referred to as an upper layer identifier), and an address identifier. For example, the sidelink transmission identifier is a 24-bit L2 ID that indicates the receiver identifier and the sender identifier.

When different information is carried in the sidelink transmission identifier, a specific implementation of step 12 is different. Specifically, step 12 includes one of the following.

1. The PSSCH is received or demodulated if the sender identifier indicated by the SCI is a target sender identifier. In this scenario, the SCI indicates the sender identifier, and when the sender identifier indicated by the SCI is one of the target sender identifier, the first terminal receives or demodulates the PSSCH corresponding to the SCI. The target sender identifier is used to indicate an identity of a terminal of interest to the first terminal. Further, when the sender identifier indicated by the SCI is not of the target sender identifier, whether to receive or demodulate the PSSCH or not may be determined based on other information indicated by the SCI.

2. The PSSCH is received or demodulated if the receiver identifier indicated by the SCI is a target receiver identifier. In this scenario, the SCI indicates the receiver identifier, and when the receiver identifier indicated by the SCI is one of the target receiver identifier, the first terminal receives or demodulates a PSSCH corresponding to the SCI. The target receiver identifier is used to indicate an identity of a receiving terminal expected by the second terminal. Further, when the receiver identifier indicated by the SCI is not of the target receiver identifier, whether to receive or demodulate the PSSCH or not may be determined based on other information indicated by the SCI.

3. The PSSCH is received or demodulated if the SCI indicates the broadcast identifier. In this scenario, the SCI indicates the broadcast identifier, and in this case, the first terminal needs to receive or demodulate the PSSCH corresponding to the SCI. Further, when the SCI does not indicate the broadcast identifier, whether to receive or demodulate the PSSCH or not may be determined based on other information indicated by the SCI.

4. The PSSCH is received or demodulated if the multicast identifier indicated by the SCI is a target multicast identifier. In this scenario, the SCI indicates the multicast identifier, and when the multicast identifier indicated by the SCI is one of the target multicast identifier, the first terminal receives or demodulates the PSSCH corresponding to the SCI. The multicast identifier is used to indicate an identity of a sending terminal of interest to the first terminal and/or an identity of a receiving terminal of expected by the second terminal. Further, when the multicast identifier indicated by the SCI is not of the target multicast identifier, whether to receive or demodulate the PSSCH or not may be determined based on other information indicated by the SCI.

5. The PSSCH is received or demodulated if the unicast identifier indicated by the SCI is a target unicast identifier. In this scenario, the SCI indicates the unicast identifier, and when the unicast identifier indicated by the SCI is one of the target unicast identifier, the first terminal receives or demodulates the PSSCH corresponding to the SCI. The unicast identifier is used to indicate an identity of a sending terminal of interest to the first terminal and/or an identity of a receiving terminal of expected by the second terminal. Further, when the unicast identifier indicated by the SCI is not of the target unicast identifier, whether to receive or demodulate the PSSCH or not may be determined based on other information indicated by the SCI.

The sidelink transmission identifier may be explicitly indicated by the SCI or implicitly indicated by the SCI. In the following embodiments of this disclosure, a specific form of the sidelink transmission identifier is further described from these two perspectives.

Manner 1: The sidelink transmission identifier is carried in an indicator field of the SCI.

This manner is an explicit indication manner. The indicator field includes one of the following: a first indicator field including at least some bits of the sidelink transmission identifier; and a second indicator field with a preset quantity of bits, constructed according to a preset rule.

The first indicator field refers to some or all of bits of the sidelink transmission identifier carried in the SCI (for example, the sender identifier, the receiver identifier, the broadcast identifier, the multicast identifier, and the unicast identifier). These bits constitute an independent indicator field of the SCI.

The second indicator field is determined based on the sidelink transmission identifier. That is, the second indicator field is an indicator field with a fixed bit length, constructed by using at least one of the sender identifier, the receiver identifier, the broadcast identifier, the multicast identifier, the unicast identifier, and the like. For example, the second indicator field is some or all bits of at least one of the sender identifier, the receiver identifier, the broadcast identifier, the multicast identifier, the unicast identifier, and the like (for example, some or all bits of a receiving group ID for multicast and/or a receiver ID for unicast). Alternatively, the second indicator field is an indicator field with a fixed bit length, constructed according to a preset rule by using the sidelink transmission identifier as input, for example, an indicator field with a fixed bit length, constructed according to a binary and/or hash (hash) function by using the sidelink transmission identifier as input.

In addition, the second indicator field may alternatively be determined based on mapping information of the sidelink transmission identifier. For example, a mapping relationship table is configured for a terminal, items in the mapping relationship table are used to indicate sidelink transmission identifiers, and a second indicator field is determined based on a configuration item in the mapping relationship table. A bit value of the second indicator field is used to indicate an item in the mapping table.

Further, in this manner, after the step of receiving sidelink control information SCI, the following is included: determining, by matching the second indicator field by using a mask, whether to receive or demodulate the PSSCH or not. The mask herein may be predefined, configured by a network device, sent by the second terminal, or autonomously generated by the first terminal. The first terminal determines, by matching the second indicator field by using the mask, whether to receive or demodulate the PSSCH or not. If matching succeeds, it is determined that the PSSCH needs to be received or demodulated, and if matching fails, the PSSCH corresponding to the SCI is no longer received or demodulated. Further, if only some bits of the sidelink transmission identifier constitute the mask, a MAC layer ID needs to be matched to determine whether to receive or demodulate the PSSCH or not.

In an optional embodiment, the indicator field (for example, the first indicator field or the second indicator field) in this embodiment of this disclosure may be independently coded or jointly coded. The scenario of independent coding of the indicator field is described above, and the scenario of joint coding of the indicator field is further described in the following embodiment. When the indicator field is jointly coded, the indicator field may also be used to indicate at least one of response information (for example, ACK/NACK), a hybrid automatic repeat request (Hybrid Automatic Repeat Request, HARQ) process number, resource allocation, and a modulation and coding scheme MCS. That is, the sidelink transmission identifier is jointly coded with at least one of the response information, the HARQ process number, the resource allocation, and the modulation and coding scheme MCS.

Manner 2: The sidelink transmission identifier is a cyclic redundancy check (Cyclic Redundancy Check, CRC) for scrambling the SCI.

This manner is also an explicit indication manner. Different from the independent indicator field manner in Manner 1, this manner is a scrambling manner. For example, the first indicator field or the second indicator field may be used as the CRC for scrambling the SCI.

Manner 3: The sidelink transmission identifier corresponds to target information indicated by the SCI.

This manner is an implicit indication manner, and the sidelink transmission identifier is indicated by the target information indicated by the SCI. The target information includes at least one of resource allocation information, beam transmission mode information, and demodulation reference signal (De-Modulation Reference Signal, DMRS) information. For example, resource (pool) allocation and/or a beam transmission mode is related to unicast, multicast, or broadcast. The resource allocation information includes information of at least one of time domain, frequency domain, spatial domain (beam), and a resource pool of a resource in which the SCI is located. In this way, whether data in the PSSCH is unicast, multicast, or broadcast is determined according to the detected resource time domain, frequency domain, spatial domain (beam), and resource pool of the resource in which the SCI is located. Further, the beam transmission mode includes at least one of single beam transmission, multi-beam transmission, and beam sweeping.

Further, after step 12, the method further includes: if it is determined not to receive or demodulate the PSSCH, performing resource sensing (sensing) and/or resource reservation based on a resource scheduled or reserved by the SCI.

Alternatively, after step 12, the method further includes: if it is determined to receive or demodulate the PSSCH, feeding back response information based on a PSSCH processing result. Particularly, for data that requires transmission of response feedback, an ACK is fed back at a physical layer when the PSSCH is received and successfully demodulated, and a NACK is fed back when the PSSCH is not received or not successfully demodulated. In this way, the first terminal feeds back the response information based on an actual PSSCH processing status. When successfully receiving and demodulating the PSSCH, the first terminal feeds back an ACK to inform a sending terminal that unnecessary retransmission is not required, so as to save system resources. When failing to receive or demodulate the PSSCH, the first terminal feeds back a NACK to indicate timely retransmission to the sending terminal, so as to reduce a processing delay.

The implementation of the sidelink information transmission method is briefly described above, and is further described in the following embodiment with reference to specific application examples.

Example 1

It is assumed that the sidelink transmission identifier includes a sender identifier and a receiver identifier. The sender identifier and the receiver identifier are 24-bit L2 IDs, and indicate a sending-side terminal and a receiving-side terminal, respectively. The SCI received by the first terminal includes an indicator field of the receiver identifier, and a CRC of the SCI is not scrambled. The first terminal obtains at least one target receiver identifier. The target receiver identifier may be predefined or configured by a higher layer, and the target receiver identifier may be a multicast or unicast receiver identifier expected by the sending-side terminal (for example, the second terminal).

If the receiver identifier carried in the SCI received by the first terminal matches the target receiver identifier of the first terminal, the first terminal continues to receive and demodulate the PSSCH scheduled by the SCI. The first terminal reports the receiver identifier to an upper layer (for example, a MAC layer and an application layer). For unicast data or multicast data that requires feedback of response information (for example, the SCI indicates that unicast or multicast requires feedback of response information), the response information is encoded and fed back at a physical layer of the first terminal. If the receiver identifier does not match the target receiver identifier, the first terminal does not receive or demodulate the PSSCH scheduled by the SCI. Further, if an autonomous resource selection mode is configured for the first terminal, the first terminal may perform subsequent resource sensing and reservation based on a resource allocation or reservation indication of the SCI.

This example prevents the first terminal from receiving and demodulating a PSSCH of no interest, thereby reducing unnecessary demodulation processing and reducing energy consumption. In addition, the response information may be fed back after PSSCH data is demodulated, thereby avoiding unnecessary retransmission and improving system resource utilization. A sender may be instructed to retransmit failed data in time, thereby reducing a processing delay.

Example 2

It is assumed that a sender identifier and a receiver identifier in the sidelink transmission identifier are 24-bit L2 IDs, and indicate a sending-side terminal and a receiving-side terminal, respectively. A CRC of the SCI received by the first terminal is scrambled by using an indicator field for a transmission mode (unicast, multicast, or broadcast) (an indicator field used to indicate a unicast identifier, a multicast identifier, or a broadcast identifier in the sidelink transmission identifier). The SCI includes an indicator field for an actual receiver identifier, and if broadcast is intended, the SCI may not include the indicator field for a receiver identifier or the indicator field is used for other purposes. In addition, the first terminal obtains at least one target receiver identifier. The target receiver identifier may be predefined or configured by a higher layer, and the target receiver identifier may be a multicast or unicast receiver identifier expected by the sending-side terminal.

The first terminal monitors the PSCCH and monitors or blindly detects SCI based on the indicator field for a transmission mode. If the first terminal verifies CRC check of SCI, the first terminal knows a transmission mode of a PSSCH scheduled by the SCI. If the PSSCH is for multicast or unicast, the first terminal proceeds to read the indicator field for indicating a receiver identifier from the SCI. If the receiver identifier indicated in the SCI matches the target receiver identifier, the first terminal continues to receive and demodulate the PSSCH scheduled by the SCI. The first terminal reports the receiver identifier to an upper layer (for example, a MAC layer and an application layer). For unicast data or multicast data that requires feedback of response information (for example, the SCI indicates that unicast or multicast requires feedback of response information), the response information is encoded and fed back at a physical layer of the first terminal. If the receiver identifier does not match the target receiver identifier, the first terminal does not receive or demodulate the PSSCH scheduled by the SCI. Further, if an autonomous resource selection mode is configured for the first terminal, the first terminal may perform subsequent resource sensing and reservation based on a resource allocation or reservation indication of the SCI.

Example 3

It is assumed that a sender identifier and a receiver identifier in the sidelink transmission identifier are 24-bit L2 IDs, and indicate a sending-side terminal and a receiving-side terminal, respectively. A CRC of the SCI received by the first terminal is scrambled by using an indicator field for a receiver identifier. The first terminal obtains at least one target receiver identifier. The target receiver identifier may be predefined or configured by a higher layer, and the target receiver identifier may be a multicast or unicast receiver identifier expected by the sending-side terminal.

The first terminal monitors the PSCCH and monitors or blindly detects SCI based on the indicator field for a transmission mode. If a scrambled receiver identifier matches the target receiver identifier, CRC check of the SCI is passed, and the first terminal knows a transmission type of a PSSCH scheduled by the SCI and a receiver identifier. The first terminal continues to receive and demodulate the PSSCH scheduled by the SCI. The first terminal reports the receiver identifier to an upper layer (for example, a MAC layer and an application layer). For data that requires feedback of response information, the response information is encoded at a physical layer of the first terminal.

Example 4

It is assumed that a sender identifier and a receiver identifier in the sidelink transmission identifier are 24-bit L2

IDs, and indicate a sending-side terminal and a receiving-side terminal, respectively. A CRC of the SCI received by the first terminal is scrambled by using an indicator field for a receiver identifier and the sender identifier. For example, for broadcast or multicast data, the receiver identifier is used to scramble the CRC, and for unicast data, the sender identifier is used to scramble the CRC. In addition, the first terminal obtains at least one target receiver identifier. The target receiver identifier may be predefined or configured by a higher layer, and the target receiver identifier may be a multicast or unicast receiver identifier expected by the sending-side terminal. The first terminal obtains at least one target sender identifier. The target sender identifier may be predefined or configured by a higher layer, and the target sender identifier may be a multicast or unicast sender identifier of interest to the first terminal.

The first terminal monitors a PSCCH, and monitors or blindly detects SCI based on a sender identifier and a target sender identifier that are configured for the first terminal.

If a receiver identifier of SCI is used for scrambling and matches the target receiver identifier, CRC check of the SCI is passed, so that the first terminal knows a transmission type (broadcast or multicast) of a PSSCH scheduled by the SCI and a receiver identifier.

If a sender identifier of SCI is used for scrambling and matches the target sender identifier, CRC check of the SCI is passed, so that the first terminal knows a transmission type (unicast) of a PSSCH scheduled by the SCI and a sender identifier.

In this way, the first terminal continues to receive and demodulate the PSSCH scheduled by the SCI. The first terminal reports the receiver identifier to an upper layer (for example, a MAC layer and an application layer). For data that requires feedback of response information, the response information is encoded at a physical layer of the first terminal.

In addition, the first terminal may further detect a false alarm (false alarm) based on the sender identifier and/or the receiver identifier at a MAC layer in the PSSCH. If the PSSCH is not expected by the first terminal, the data packet is discarded.

When the first terminal does not receive or demodulate the PSSCH or the first terminal discards the PSSCH, if an autonomous resource selection mode is configured for the first terminal, the first terminal may perform subsequent resource sensing and reservation based on a resource allocation or reservation indication of the SCI.

Example 5

It is assumed that a sender identifier and a receiver identifier in the sidelink transmission identifier are 24-bit L2 IDs, and indicate a sending-side terminal and a receiving-side terminal, respectively. A MAC layer includes the sender identifier and the receiver identifier. The SCI includes a second indicator field with a fixed bit length (a preset quantity of bits, for example, 8 bits). The second indicator field is constructed based on some or all bits of the sender identifier and/or the receiver identifier, for example, 8 selected bits of the sender identifier and/or the receiver identifier, or 8 bits that are obtained through hash calculation of the sender identifier and/or the receiver identifier. The first terminal further obtains at least one target receiver identifier. The target receiver identifier may be predefined or configured by a higher layer, and the target receiver identifier may be a multicast or unicast receiver identifier expected by the sending-side terminal. In addition, the first terminal may also construct a mask with a length the same as the second indicator field. The mask is constructed based on some or all bits of the sender identifier and/or the receiver identifier. For example, the mask includes 8 selected bits of the sender identifier and/or the receiver identifier, or 8 bits that are obtained through hash calculation of the sender identifier and/or the receiver identifier. If there are a plurality of identifiers, the second indicator field or the mask may also be further constructed through binary calculation.

The first terminal monitors the PSCCH and monitors or blindly detects SCI based on an indicator field for a transmission mode. The first terminal performs a masking operation on the second indicator field of the SCI based on the constructed mask. If a result matches, it indicates that a PSSCH scheduled by the SCI may be a PSSCH of interest to the first terminal. The first terminal continues to receive and demodulate the PSSCH scheduled by the SCI. If the result does not match, the PSSCH scheduled by the SCI is not received or demodulated.

In addition, the first terminal may further detect a false alarm based on the sender identifier and/or the receiver identifier at a MAC layer in the PSSCH. If the PSSCH is not expected by the first terminal, the data packet is discarded. For example, a false alarm may occur when the second indicator field or the mask is constructed based on some or all bits of the sender identifier and/or the receiver identifier, or the length of the second indicator field or the mask is less than a length of the sender identifier and/or the receiver identifier.

When the first terminal discards the PSSCH, if an autonomous resource selection mode is configured for the first terminal, the first terminal may perform subsequent resource sensing and reservation based on a resource allocation or reservation indication of the SCI.

Example 6

It is assumed that a sender identifier and a receiver identifier in the sidelink transmission identifier are 24-bit L2 IDs, and indicate a sending-side terminal and a receiving-side terminal, respectively. The SCI includes a second indicator field with a fixed bit length (a preset quantity of bits, for example, 8 bits). Content of the second indicator field is determined by predefined or configured mapping information. For example, a mapping relationship table is configured for a terminal, items in the mapping relationship table are used to indicate sidelink transmission identifiers, and a bit value of the second indicator field is used to indicate an item in the mapping table.

The first terminal monitors the PSCCH and monitors or blindly detects SCI based on an indicator field for a transmission mode. The first terminal matches a configuration item in the mapping relationship table based on the second indicator field, and the first terminal determines the sidelink transmission identifier (for example, the sender identifier and/or the receiver identifier) by looking up the table, and the first terminal determines, based on the determined sidelink transmission identifier, whether to continue to receive and demodulate the PSSCH scheduled by the SCI.

Further, when the first terminal continues to receive and demodulate the PSSCH scheduled by the SCI, the first terminal reports the receiver identifier to an upper layer (for example, a MAC layer and an application layer). For data that requires feedback of response information, the response information is encoded at a physical layer of the first terminal.

When the first terminal does not receive or demodulate the PSSCH, if an autonomous resource selection mode is configured for the first terminal, the first terminal may perform subsequent resource sensing and reservation based on a resource allocation or reservation indication of the SCI.

In the sidelink information transmission method in this embodiment of this disclosure, the receiving-side terminal may determine, based on the sidelink transmission identifier, whether to receive or demodulate a PSSCH corresponding to the SCI or not, so that there is no need to receive or demodulate the PSSCH each time, thereby reducing processing energy consumption of the terminal and saving a processing capacity.

The sidelink information transmission method in different scenarios is separately described in detail in the foregoing embodiment. A terminal corresponding to the method is further described in the following embodiment with reference to an accompanying drawing.

Figure 2:
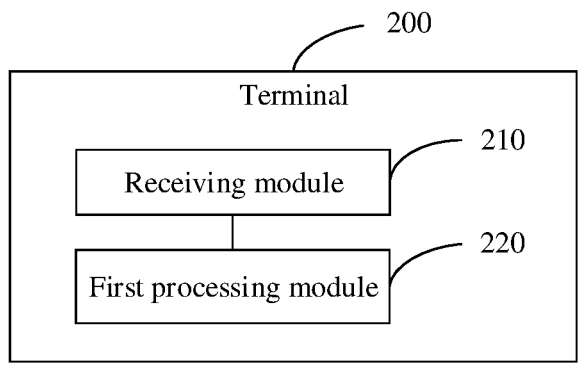
FIG. 2 is a schematic modular structural diagram of a first terminal according to an embodiment of this disclosure.

As shown in FIG. 2, a terminal 200 according to an embodiment of this disclosure can implement details of the method in the foregoing embodiment: receiving sidelink control information SCI; and determining, based on a sidelink transmission identifier indicated by the SCI, whether to receive or demodulate a physical sidelink shared channel PSSCH or not, with the same effects achieved. The terminal 200 specifically includes the following functional modules:

a receiving module 210, configured to receive sidelink control information SCI; and a first processing module 220, configured to determine, based on a sidelink transmission identifier indicated by the SCI, whether to receive or demodulate a physical sidelink shared channel PSSCH or not.

The sidelink transmission identifier is determined based on at least some bits of at least one of a layer 2 identity, an application layer identifier, and an address identifier.

The sidelink transmission identifier is configured by a higher layer or a network device, or predefined.

The sidelink transmission identifier corresponds to target information indicated by the SCI, and the target information includes at least one of resource allocation information, beam transmission mode information, and demodulation reference signal information.

The beam transmission mode includes at least one of single beam transmission, multi-beam transmission, and beam sweeping.

The sidelink transmission identifier includes at least one of a sender identifier, a receiver identifier, a broadcast identifier, a multicast identifier, and a unicast identifier.

The first processing module 220 includes one of the following:

a first processing sub-module, configured to receive or demodulate the PSSCH if the sender identifier indicated by the SCI is a target sender identifier;

a second processing sub-module, configured to receive or demodulate the PSSCH if the receiver identifier indicated by the SCI is a target receiver identifier;

a third processing sub-module, configured to receive or demodulate the PSSCH if the SCI indicates the broadcast identifier;

a fourth processing sub-module, configured to receive or demodulate the PSSCH if the multicast identifier indicated by the SCI is a target multicast identifier; and a fifth processing sub-module, configured to receive or demodulate the PSSCH if the unicast identifier indicated by the SCI is a target unicast identifier.

The sidelink transmission identifier is carried in an indicator field of the SCI, or the sidelink transmission identifier is a cyclic redundancy check CRC for scrambling the SCI.

The indicator field includes one of the following:

a first indicator field including at least some bits of the sidelink transmission identifier; and a second indicator field with a preset quantity of bits, constructed according to a preset rule.

The second indicator field is determined based on the sidelink transmission identifier, or the second indicator field is determined based on mapping information of the sidelink transmission identifier.

The terminal 200 further includes:

a determining module, configured to determine, by matching the second indicator field by using a mask, whether to receive or demodulate the PSSCH or not.

The indicator field is further used to indicate at least one of response information, a hybrid automatic repeat request HARQ process number, resource allocation, and a modulation and coding scheme MCS.

The terminal 200 further includes:

a second processing module, configured to: if it is determined not to receive or demodulate the PSSCH, perform resource sensing and/or resource reservation based on a resource scheduled or reserved by the SCI; or a third processing module, configured to: if it is determined to receive or demodulate the PSSCH, feed back response information based on a PSSCH processing result.

It should be noted that the terminal in this embodiment of this disclosure may determine, based on the sidelink transmission identifier, whether to receive or demodulate a PSSCH corresponding to the SCI or not, so that there is no need to receive or demodulate the PSSCH each time, thereby reducing processing energy consumption of the terminal and saving a processing capacity.

The sidelink information transmission method in this disclosure is described from the perspective of the receiving-side terminal in the foregoing embodiment. A sidelink information transmission method is further described from the perspective of a sending-side terminal in the following embodiment with reference to an accompanying drawing.

Figure 3:
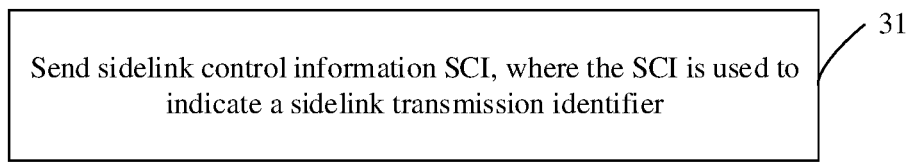
FIG. 3 is a schematic flowchart of a sidelink information transmission method for a second terminal according to an embodiment of this disclosure.

As shown in FIG. 3, an embodiment of this disclosure provides a sidelink information transmission method, applied to a second terminal. The method includes the following steps.

Step 31. Send sidelink control information SCI, where the SCI is used to indicate a sidelink transmission identifier.

The second terminal serves as a sending-side terminal, and a first terminal serves as a receiving-side terminal. Those skilled in the art can understand that when having data to send, the first terminal may also serve as a sending-side terminal, and the second terminal may also serve as a receiving-side terminal. The SCI in this embodiment of this disclosure is used to indicate a sidelink transmission identifier, or referred to as a transmission identifier ID.

The sidelink transmission identifier is configured by a higher layer or a network device, or predefined (for example, agreed upon or pre-configured by a protocol). The sidelink transmission identifier may be used to indicate identity information of a sending terminal or a receiving terminal and/or a type of data transmitted in a PSSCH corresponding to the SCI. The sidelink transmission identifier includes at least one of a sender identifier, a receiver identifier, a broadcast identifier, a multicast identifier, and a unicast identifier. In this embodiment of this disclosure, the sidelink transmission identifier is determined based on at least some bits of at least one of a layer 2 identity, an application layer identifier, and an address identifier. The sender identifier may be a sending-side terminal identifier, and the receiver identifier may be a receiving-side terminal identifier. The broadcast identifier is used to indicate that the data carried in the PSSCH is broadcast data. The multicast identifier is used to indicate that the data carried in the PSSCH is multicast data and/or a terminal identifier of a receiving group of the data carried in the PSSCH. The unicast identifier is used to indicate that the data carried in the PSSCH is unicast data and/or a receiving-side terminal identifier of the data carried in the PSSCH. For example, the sender identifier is a 24-bit L2 ID.

In this embodiment of this disclosure, the sidelink transmission identifier may be explicitly indicated by the SCI or implicitly indicated by the SCI. In the following embodiments of this disclosure, a specific form of the sidelink transmission identifier is further described from these two perspectives.

An explicit indication manner is as follows: The sidelink transmission identifier is carried in the indicator field of the SCI, or the sidelink transmission identifier is a cyclic redundancy check CRC for scrambling the SCI.

The indicator field includes one of the following: a first indicator field including at least some bits of the sidelink transmission identifier; and a second indicator field with a preset quantity of bits, constructed according to a preset rule.

Specifically, the first indicator field refers to some or all of bits of the sidelink transmission identifier carried in the SCI. These bits constitute an independent indicator field of the SCI. The second indicator field is determined based on the sidelink transmission identifier, or the second indicator field is determined based on mapping information of the sidelink transmission identifier. For example, the second indicator field is constructed by using some or all bits of at least one of the sender identifier, the receiver identifier, the broadcast identifier, the multicast identifier, the unicast identifier, and the like. Alternatively, a mapping relationship table is configured for a terminal, items in the mapping relationship table are used to indicate sidelink transmission identifiers, and a second indicator field is determined based on a configuration item in the mapping relationship table. The second indicator field is used to indicate an item in the mapping table.

The indicator field (for example, the first indicator field or the second indicator field) in this embodiment of this disclosure may be independently coded or jointly coded. When the indicator field is jointly coded, the indicator field may also be used to indicate at least one of response information (for example, ACK/NACK), a hybrid automatic repeat request HARQ process number, resource allocation, and a modulation and coding scheme MCS. That is, the sidelink transmission identifier is jointly coded with at least one of the response information, the HARQ process number, the resource allocation, and the modulation and coding scheme MCS.

The explication indication manner is described above, and an implicit indication manner is further described below: The sidelink transmission identifier corresponds to target information indicated by the SCI, and the target information includes at least one of resource allocation information, beam transmission mode information, and demodulation reference signal information. For example, resource (pool) allocation and/or a beam transmission mode is related to unicast, multicast, or broadcast. The resource allocation information includes information of at least one of time domain, frequency domain, spatial domain (beam), and a resource pool of a resource in which the SCI is located. Further, the beam transmission mode includes at least one of single beam transmission, multi-beam transmission, and beam sweeping.

In the sidelink information transmission method in this embodiment of this disclosure, the terminal sends the SCI to another terminal to indicate the sidelink transmission identifier, so that the another terminal determines, based on the sidelink transmission identifier, whether to receive or demodulate a PSSCH corresponding to the SCI or not. This can reduce processing energy consumption of the another terminal and save a processing capacity.

The sidelink information transmission method in different scenarios is described in the foregoing embodiment. A terminal corresponding to the method is further described below with reference to an accompanying drawing.

Figure 4:
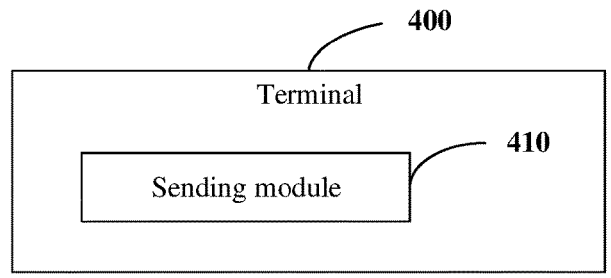
FIG. 4 is a schematic modular structural diagram of a second terminal according to an embodiment of this disclosure.

As shown in FIG. 4, a terminal 400 according to an embodiment of this disclosure can implement details of the method in the foregoing embodiment: sending sidelink control information SCI, where the SCI is used to indicate a sidelink transmission identifier, with the same effects achieved. The terminal 400 specifically includes the following functional modules:

a sending module, configured to send sidelink control information SCI, where the SCI is used to indicate a sidelink transmission identifier.

The sidelink transmission identifier is determined based on at least some bits of at least one of a layer 2 identity, an application layer identifier, and an address identifier.

The sidelink transmission identifier is configured by a higher layer or a network device, or predefined.

The sidelink transmission identifier corresponds to target information indicated by the SCI, and the target information includes at least one of resource allocation information, beam transmission mode information, and demodulation reference signal information.

The beam transmission mode includes at least one of single beam transmission, multi-beam transmission, and beam sweeping.

The sidelink transmission identifier includes at least one of a sender identifier, a receiver identifier, a broadcast identifier, a multicast identifier, and a unicast identifier.

The sidelink transmission identifier is carried in an indicator field of the SCI, or the sidelink transmission identifier is a cyclic redundancy check CRC for scrambling the SCI.

The indicator field includes one of the following:

a first indicator field including at least some bits of the sidelink transmission identifier; and a second indicator field with a preset quantity of bits, constructed according to a preset rule.

The second indicator field is determined based on the sidelink transmission identifier, or the second indicator field is determined based on mapping information of the sidelink transmission identifier.

The indicator field is further used to indicate at least one of response information, a hybrid automatic repeat request HARQ process number, resource allocation, and a modulation and coding scheme MCS.

It should be noted that the terminal in this embodiment of this disclosure sends the SCI to another terminal to indicate the sidelink transmission identifier, so that the another terminal determines, based on the sidelink transmission identifier, whether to receive a PSSCH corresponding to the SCI or not. This can reduce processing energy consumption of the another terminal and save the processing capacity.

It should be noted that, it should be understood that division of modules of the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (Application-Specific Integrated Circuit, ASIC), or one or more microprocessors (digital signal processor, DSP), or one or more field programmable gate arrays (Field Programmable Gate Array, FPGA). For another example, when one of the foregoing modules is implemented in a form of program code invoked by a processing component, the processing component may be a general purpose processor, for example, a central processing unit (Central Processing Unit, CPU) or another processor that may invoke program code. For another example, the modules may be integrated in a form of a system-on-a-chip (system-on-a-chip, SOC) for implementation.

Figure 5:
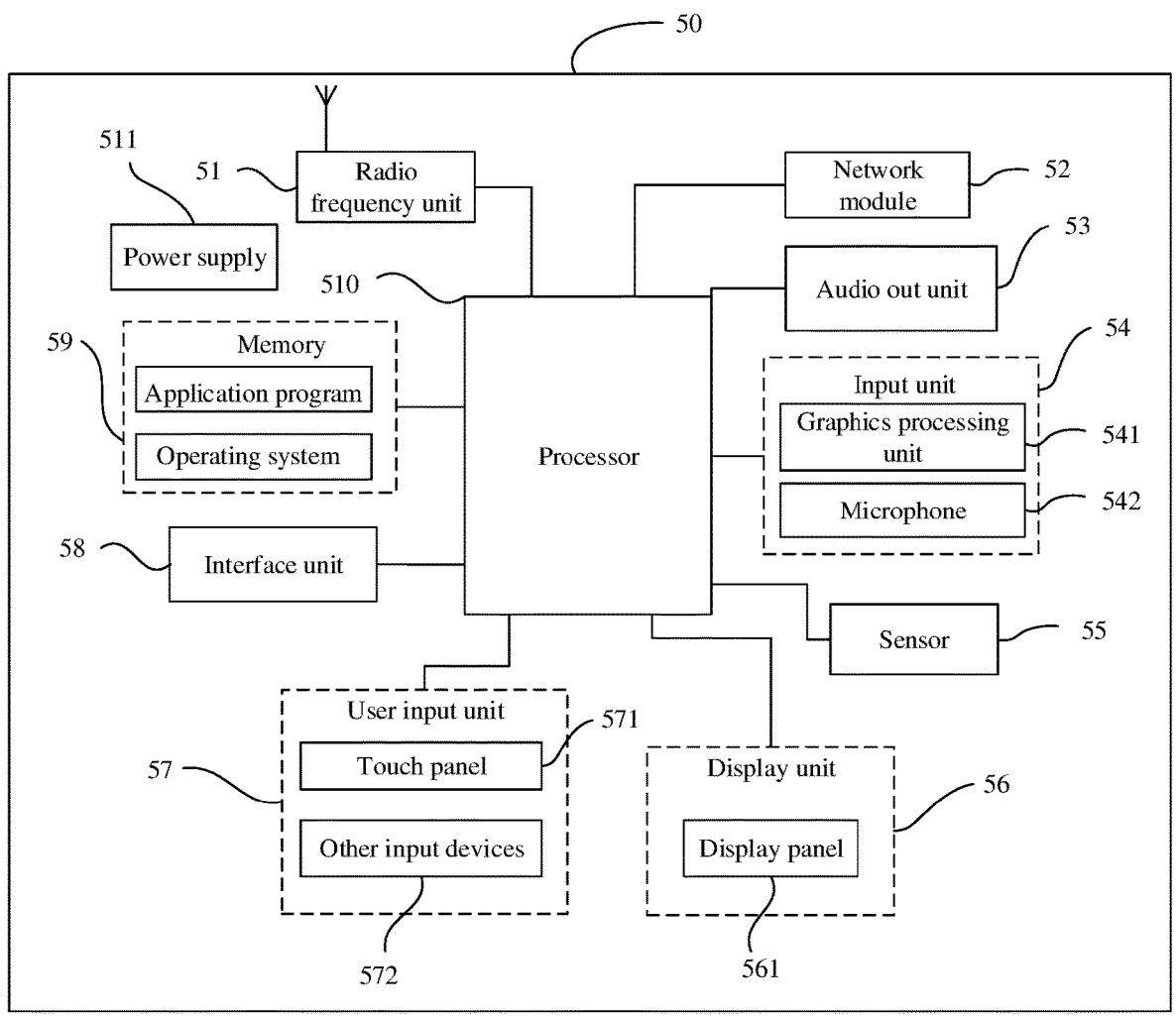
FIG. 5 is a block diagram of a terminal according to an embodiment of this disclosure.

To better achieve the foregoing objective, further, FIG. 5 is a schematic diagram of a hardware structure of a terminal for implementing each embodiment of this disclosure. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. A person skilled in the art may understand that the structure of the terminal shown in FIG. 5 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

When the terminal is a receiving-side terminal, the radio frequency unit 51 is configured to receive sidelink control information SCI.

The processor 510 is configured to determine, based on a sidelink transmission identifier indicated by the SCI, whether to receive or demodulate a physical sidelink shared channel PSSCH or not.

When the terminal is a sending-side terminal, the radio frequency unit 51 is configured to send sidelink control information SCI, where the SCI is used to indicate a sidelink transmission identifier.

The terminal in this embodiment of this disclosure may determine, based on the sidelink transmission identifier, whether to receive or demodulate a PSSCH corresponding to the SCI or not, there is no need to receive or demodulate the PSSCH each time, thereby reducing processing energy consumption of the terminal and saving a processing capacity.

It should be understood that in this embodiment of this disclosure, the radio frequency unit 51 may be configured to: receive and send signals in an information receiving/sending process or a call process; and specifically, after receiving downlink data from a base station, send the downlink data to the processor 510 for processing, and, send uplink data to the base station. Generally, the radio frequency unit 51 includes but is not limited to an antenna, at least one amplifier, a transceiver, a coupler, a low noise amplifier, a duplexer, and the like. In addition, the radio frequency unit 51 may further communicate with a network and another device through a wireless communications system.

The terminal provides wireless broadband internet access for a user by using the network module 52, for example, helps the user send and receive e-mails, browse web pages, and access streaming media.

The audio output unit 53 may convert audio data received by the radio frequency unit 51 or the network module 52 or stored in the memory 59 into an audio signal and output the audio signal as a sound. In addition, the audio output unit 53 may further provide audio output (for example, a call signal reception tone or a message reception tone) that is related to a specific function performed by the terminal 50. The audio output unit 53 includes a speaker, a buzzer, a telephone receiver, and the like.

The input unit 54 is configured to receive an audio or video signal. The input unit 54 may include a graphics processing unit (Graphics Processing Unit, GPU) 541 and a microphone 542, and the graphics processing unit 541 processes image data of a still picture or a video obtained by an image capture apparatus (for example, a camera) in an image capture mode or a video capture mode. A processed image frame may be displayed on the display unit 56. An image frame processed by the graphics processing unit 541 may be stored in the memory 59 (or another storage medium) or sent by the radio frequency unit 51 or the network module 52. The microphone 542 can receive a sound and can process the sound into audio data. The processed audio data can be converted, for outputting, into a format that can be sent to a mobile communication base station through the radio frequency unit 51 in a telephone call mode.

The terminal 50 further includes at least one sensor 55, for example, an optical sensor, a motion sensor, and another sensor. Specifically, the optical sensor includes an ambient light sensor and a proximity sensor. The ambient light sensor may adjust brightness of a display panel 561 based on intensity of ambient light. When the terminal 50 moves near an ear, the proximity sensor may disable the display panel 561 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 55 may further include a fingerprint sensor, a pressure sensor, an iris sensor, a molecular sensor, a gyroscope, a barometer, a hygrometer, a thermometer, or an infrared sensor. Details are not described herein.

The display unit 56 is configured to display information input by the user or information provided for the user. The display unit 56 may include the display panel 561. The display panel 561 may be configured in a form of a liquid crystal display (Liquid Crystal Display, LCD), an organic light-emitting diode (Organic Light-Emitting Diode, OLED), or the like.

The user input unit 57 may be configured to receive input digit or character information, and generate a key signal input related to a user setting and function control of the terminal. Specifically, the user input unit 57 includes a touch panel 571 and other input devices 572. The touch panel 571, also referred to as a touchscreen, may capture a touch operation performed by a user on or near the touch panel (for example, an operation performed by the user on the touch panel 571 or near the touch panel 571 by using any appropriate object or accessory such as a finger or a stylus). The touch panel 571 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 510, and receives and executes a command sent by the processor 510. In addition, the touch panel 571 may be implemented in a plurality of forms, for example, as a resistive, capacitive, infrared, or surface acoustic wave touch panel. The user input unit 57 may further include other input devices 572 in addition to the touch panel 571. Specifically, the other input devices 572 may include but are not limited to a physical keyboard, a function key (such as a volume control key or a power on/off key), a trackball, a mouse, a joystick, and the like. Details are not described herein.

Further, the touch panel 571 may cover the display panel 561. After detecting a touch operation on or near the touch panel 571, the touch panel 571 transmits the touch operation to the processor 510 to determine a type of a touch event. Then the processor 510 provides corresponding visual output on the display panel 561 based on the type of the touch event. In FIG. 5, the touch panel 571 and the display panel 561 serve as two independent components to implement input and output functions of the terminal. However, in some embodiments, the touch panel 571 and the display panel 561 may be integrated to implement the input and output functions of the terminal. This is not specifically limited herein.

The interface unit 58 is an interface for connecting an external apparatus to the terminal 50. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 58 may be configured to receive input (for example, data information and electric power) from the external apparatus, and transmit the received input to one or more elements in the terminal 50; or may be configured to transmit data between the terminal 50 and the external apparatus.

The memory 59 may be configured to store a software program and various data. The memory 59 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 59 may include a high-speed random access memory, or may include a non-volatile memory, for example, at least one magnetic disk storage device, a flash memory device, or other volatile solid-state storage devices.

The processor 510 is a control center of the terminal, connects various parts of the entire terminal by using various interfaces and lines, and executes various functions and data processing of the terminal by running or executing a software program and/or a module stored in the memory 59 and invoking data stored in the memory 59, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It may be understood that the modem processor may alternatively not be integrated into the processor 510.

The terminal 50 may further include a power supply 511 (for example, a battery) that supplies power to each component. Optionally, the power supply 511 may be logically connected to the processor 510 by using a power management system, so as to implement functions such as charging management, discharging management, and power consumption management by using the power management system.

In addition, the terminal 50 includes some functional modules that are not shown. Details are not described herein.

Optionally, an embodiment of this disclosure further provides a terminal, including a processor 510, a memory 59, and a computer program stored in the memory 59 and capable of running on the processor 510. When the computer program is executed by the processor 510, the processes of the foregoing embodiments of the sidelink information transmission method are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (Radio Access Network, RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS) phone, a cordless telephone set, a session initiation protocol (Session Initiated Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

An embodiment of this disclosure further provides a computer-readable storage medium, where the computer-readable storage medium stores a computer program. When the computer program is executed by a processor, the processes of the embodiments of the foregoing sidelink information transmission method are implemented, and a same technical effect can be achieved. To avoid repetition, details are not described herein again. For example, the computer-readable storage medium is a read-only memory (Read-Only Memory, ROM), a random access memory (Random Access Memory, RAM), a magnetic disk, or an optical disk.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A sidelink information transmission method, applied to a first terminal side, wherein the sidelink information transmission method comprises:
   receiving sidelink control information (SCI) at a physical layer of a first terminal; and
   determining, based on a sidelink transmission identifier indicated by the SCI, whether to receive or demodulate a physical sidelink shared channel (PSSCH) or not,
   wherein the sidelink transmission identifier comprises at least one of a broadcast identifier, a multicast identifier, and a unicast identifier;
   the sidelink information transmission method further comprises:

determining whether the sidelink transmission identifier of data in the PSSCH associated with the SCI is the broadcast identifier according to a resource pool where the SCI is in;

receiving or demodulating the PSSCH when it is determined that the sidelink transmission identifier of the data in the PSSCH associated with the SCI is the broadcast identifier;

after receiving or demodulating the PSSCH, feeding back response information based on a PSSCH processing result, wherein the response information is encoded and fed back at the physical layer of the first terminal.

2. The sidelink information transmission method according to claim 1, wherein the sidelink transmission identifier comprises at least one of a sender identifier, and a receiver identifier.

3. The sidelink information transmission method according to claim 2, wherein the step of determining, based on a sidelink transmission identifier indicated by the SCI, whether to receive or demodulate the PSSCH or not comprises one of the following:

receiving or demodulating the PSSCH if the sender identifier indicated by the SCI is a target sender identifier;

receiving or demodulating the PSSCH if the receiver identifier indicated by the SCI is a target receiver identifier.

4. The sidelink information transmission method according to claim 1, wherein after the step of determining, based on a sidelink transmission identifier indicated by the SCI, whether to receive or demodulate the PSSCH or not, the method further comprises:

if it is determined not to receive or demodulate the PSSCH, performing resource sensing and/or resource reservation based on a resource scheduled or reserved by the SCI.

5. A non-transitory tangible computer-readable storage medium, wherein the non-transitory tangible computer-readable storage medium stores a computer program, and when a processor executes the computer program, the steps of the sidelink information transmission method according to claim 1 are implemented.

6. The sidelink information transmission method according to claim 1, wherein the sidelink transmission identifier is a cyclic redundancy check (CRC) for scrambling the SCI.

7. A terminal, wherein the terminal is a first terminal, and comprises: a processor, a memory, and a computer program stored in the memory and running on the processor, wherein the processor is configured to execute the computer program to:

receive sidelink control information (SCI) at a physical layer of the first terminal; and determine, based on a sidelink transmission identifier indicated by the SCI, whether to receive or demodulate a physical sidelink shared channel (PSSCH) or not, wherein the sidelink transmission identifier comprises at least one of a broadcast identifier, a multicast identifier, and a unicast identifier;

wherein the processor is further configured to execute the computer program to:

determine whether the sidelink transmission identifier of data in the PSSCH associated with the SCI is the broadcast identifier according to a resource pool where the SCI is in;

receive or demodulate the PSSCH when it is determined that the sidelink transmission identifier of the data in the PSSCH associated with the SCI is the broadcast identifier;

wherein the processor is configured to execute the computer program to:

after receiving or demodulating the PSSCH, feed back response information based on a PSSCH processing result, wherein the response information is encoded and fed back at the physical layer of the first terminal.

8. The terminal according to claim 7, wherein the sidelink transmission identifier comprises at least one of a sender identifier, and a receiver identifier.

9. The terminal according to claim 8, wherein the processor is further configured to execute the computer program to:

receive or demodulate the PSSCH if the sender identifier indicated by the SCI is a target sender identifier; or receive or demodulate the PSSCH if the receiver identifier indicated by the SCI is a target receiver identifier.

10. The terminal according to claim 7, wherein the processor is further configured to execute the computer program to: after determining, based on a sidelink transmission identifier indicated by the SCI, whether to receive or demodulate the PSSCH or not, if it is determined not to receive or demodulate the PSSCH, perform resource sensing and/or resource reservation based on a resource scheduled or reserved by the SCI.

11. The terminal according to claim 7, wherein the sidelink transmission identifier is a cyclic redundancy check (CRC) for scrambling the SCI.

* * * * *